United States Patent Office 3,117,961
Patented Jan. 14, 1964

3,117,961
WATER-SOLUBLE DYESTUFFS CONTAINING TRISMETHYLOL-GLYOXALDIUREINE RADICALS
Guenter Lange, Ludwigshafen (Rhine) Gartenstadt, Guenter Krehbiel, Ludwigshafen (Rhine), Fritz Kohler, Mannheim, and Hans-Joachim Grasshoff, Ludwigshafen (Rhine), Germany, assignors to Badische Anilin- & Soda-Fabrik Aktiengesellschaft, Ludwigshafen (Rhine), Germany
No Drawing. Filed June 7, 1960, Ser. No. 34,368
Claims priority, application Germany June 11, 1959
4 Claims. (Cl. 260—157)

This invention relates to water-soluble dyestuffs of the azo and anthraquinone series which contain sulfonic acid and methylol groups and to a process for the production of these dyestuffs.

It is an object of this invention to provide dyestuffs which give on textile materials, such as fibers, flocks, threads, woven and non-woven textiles, especially of native or regenerated cellulose, such as cotton or staple fiber, dyeings or prints with excellent fastness properties.

Another object of this invention is to provide a process for the production of these dyestuffs.

In particular, this invention relates to water-soluble dyestuffs containing trismethylol-glyoxaldiureine radicals and sulfonic acid groups in the molecule and having the general formula

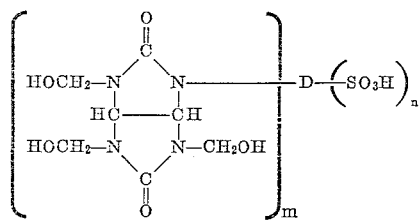

in which D represents the radical of an azo or an anthraquinone dyestuff, $m$ is 1 or 2, and $n$ is 1, 2 or 3. By the terms azo dyestuff and anthraquinone dyestuff we mean within the scope of the present invention monoazo dyestuffs, disazo dyestuffs, metal-containing monoazo dyestuffs and mononuclear anthraquinone dyestuffs. The term metal-containing monoazo dyestuffs includes the cobalt and chromium complexes of the said monoazo dyestuffs.

The said dyestuffs, in so far as they are azo dyestuffs are prepared for example by coupling diazotized aminophenylglyoxaldiureines with compounds of the benzenes, naphthalene or pyrazolone series bearing sulfonic acid groups and being capable of coupling, and then reacting the coupling products with aqueous formaldehyde in weak acid to alkaline medium.

Another way of preparing the said azo dyestuffs is to couple aromatic diazo compounds with compounds of the benzene, naphthalene or pyrazolone series which are capable of coupling and which bear one or two trismethylolglyoxaldiureine radicals or one or two glyoxaldiureine radicals. In the latter case the coupling products are then reacted with aqueous formaldehyde in weak acid to alkaline medium.

Anthraquinone dyestuffs of the above specified formula may be prepared for example by the reaction of anthraquinone dyestuffs which have one or two ureido groups with glyoxalmonoureine; the reaction products are then treated with aqueous formaldehyde in weak acid to alkaline medium.

Another way of obtaining anthraquinone dyestuffs of the above specified formula consists for example in reacting 1-amino-4-bromanthraquinone-2-sulfonic acid with aminophenylglyoxaldiureines and treating the reaction products with aqueous formaldehyde in weak acid to alkaline medium.

In all cases the said initial materials are so chosen that the final dyestuffs contain one to three sulfonic acid groups in the molecule.

The reaction of the dyestuffs containing glyoxaldiureine radicals with formaldehyde or agents supplying formaldehyde may be carried out for example by making the dyestuffs, possibly as aqueous pastes, into a paste with aqueous alkali metal hydroxide or alkali metal carbonate solutions, mixing the paste with an amount of aqueous formaldehyde measured according to the number of methylol groups to be introduced and stirring the mixture at room temperature or while cooling to about 0° C. until the reaction is complete. The reaction product is then separated for example by adding sodium chloride, filtered and carefully dried, for example under reduced pressure.

The compounds which are capable of coupling and which contain glyoxaldiureine radicals in the molecule can be treated for example in aqueous solution or suspension with an amount of aqueous formaldehyde measured according to the number of methylol groups to be introduced, possibly with the addition of basic reacting substances, such as sodium carbonate, potassium carbonate, sodium bicarbonate or sodium hydroxide, at room temperature or at moderately elevated temperature, for example 50° C., and then the reaction products coupled to azo dyestuffs.

When reacting the dyestuffs or coupling components containing the glyoxaldiureine radical with aqueous formaldehyde and also when coupling the coupling components containing methylol groups to form azo dyestuffs, the use of high temperatures is to be avoided because otherwise condensation of the compounds containing methylol groups takes place.

The dyestuffs or coupling components containing glyoxaldiureine radicals required for the production of the new dyestuffs are obtained by the reaction of suitable substituted ureido compounds with glyoxal monoureine or diethers of glyoxal monoureine. Thus for example by reacting ureido-acylaminobenzenes with glyoxalmonoureine and subsequently saponifying the acylamino groups there are obtained diazo components which contain glyoxaldiureine radicals. Coupling components with glyoxaldiureine radicals may for example be prepared in the same way from glyoxalmonoureine and ureido-hydroxybenzenes, ureido-hydroxynaphthalenes and ureido-hydroxynaphthalene sulfonic acids.

The new dyestuffs are suitable for dyeing or printing textile materials of wool, synthetic linear polyamides or polyurethanes, leather and especially textile materials of natural or regenerated cellulose.

When dyeing or printing the said textile materials, the new dyestuffs of this invention are applied to the goods to be dyed together with acids or potential acid donors and then fixed by heat treatment at temperatures of 100° to 160° C., preferably 120° to 150° C.

Acids which are suitable for this dyeing process include boric acid, phosphoric acid, formic acid, acetic acid, glycollic acid, tartaric acid, chloracetic acid, chlorpropionic acid, citric acid and malic acid. In addition to these acids, or instead of them, there may also be used salts which in aqueous solution have an acid reaction by reason of hydrolysis or which split off acids at high temperatures. Such salts include ammonium nitrate, ammonium chloride, monoammonium phosphate, zinc chloride, magnesium chloride or diethanolammonium chloride.

It is assumed that by the use of acids or potential acid donors and the subsequent heat treatment, reactions between the methylol groups of the new dyestuffs and reactive sections of the fibrous materials, for example the hydroxy groups of cellulose, are made possible or accelerated in such a way that dyeings or prints of excellent fastness properties, especially excellent wet fastness properties are obtained.

The dyeing may be carried out for example by treating the goods to be dyed with aqueous solutions which contain the new dyestuffs at 10° to 110° (preferably at 50° to 100° C. when the dyeing process is carried out in a dyeing bath, and at 20° to 60° C. when the dyestuff is applied by padding).

The coemployment of the usual dyeing auxiliaries is often advisable. As dyeing auxiliaries there may be used for example inorganic salts, such as sodium sulfate, surface-active compounds, plasticizers, optical brighteners and thickening agents.

The dyestuffs are suitable for continuous and discontinuous dyeing processes and for local dyeing, for example for calico printing. The usual dyeing auxiliaries, such as thickening agents, for example British gum or tragacanth, may also be coemployed.

The dyeing may be carried out by various methods. For example the goods to be dyed may be treated at temperatures of 10° to 110° C., preferably 50° to 100° C., with aqueous solutions which contain the new dyestuffs, one or more of the acids or acid donors listed above and also advantageously the usual dyeing auxiliaries, for example sodium sulfate. It is preferable to add the acids or acid donors used to the dyebaths toward the end of the dyeing process. To fix the dyestuffs, the dyed textile materials are dried and then treated with hot air or steam at temperatures of 100° to 160° C., preferably 120° to 150° C.

Another dyeing method comprises padding the goods to be dyed with aqueous solutions which contain the new dyestuffs, one or more of the acids or acid donors listed above and conventional dyeing auxiliaries. The goods to be dyed are then dried and treated with steam or hot air as described above.

According to another variant of the dyeing process, the materials to be dyed are impregnated with aqueous solutions of the new methylol dyestuffs and, after drying, passed through an aqueous bath which contains inorganic salts, for example sodium sulfate, and one or more of the acids or acid donors listed above. The dyed material is then dried and treated with steam or hot air as described above.

The new dyestuffs may also be applied according to the usual methods for local dyeing, for example calico printing. The printing pastes then contain the new dyestuffs, thickening agents, one or more of the acids or acid donors listed above and conventional printing auxiliaries, for example urea. After drying the printed goods are treated with hot air or steam as described above.

Brilliant dyeings and prints of excellent fastness properties, above all excellent wet fastness properties, are obtained by the dyeing and printing processes described above. The dyeing process requires no additional measures and is easy to carry out in conventional apparatus.

The following examples will further illustrate this invention but the invention is not restricted to these examples. The parts and percentages are by weight.

EXAMPLE 1

100 parts of ice are added to a suspension of 23.3 parts of N-(4-aminophenyl)-glyoxaldiureine, 100 parts of water and 25 parts of hydrochloric acid of the density 1.15, and a solution of 6.9 parts of sodium nitrite in 20 parts of water is allowed to flow in. The diazotization mixture is stirred for half an hour and then allowed to flow into a solution of 22.4 parts of 2-hydroxynaphthalene-5-sulfonic acid, 4 parts of sodium hydroxide and 16 parts of anhydrous sodium carbonate in 320 parts of water at 5° to 10° C. After 1 to 2 hours, the reaction product is deposited by adding sodium chloride, filtered and stirred as an aqueous paste for 20 hours at room temperature together with 100 parts of a 15% aqueous formaldehyde solution and 2 parts of sodium hydroxide. The dyestuff containing methylol groups is separated by adding sodium chloride, filtered and dried at 40° to 50° C. under reduced pressure. Bleached cotton fabric is impregnated on a Foulard with an aqueous solution containing in 1000 parts 20 parts of this methylol dyestuff and 5 parts of ammonium nitrate. The fabric is then squeezed off, dried and treated with air heated to 150° C. for five minutes. After soaping at 60° C. and then drying a brilliant red dyeing of excellent wet fastness is obtained.

The N-(4-aminophenyl)-glyoxaldiureine used as the diazo component may be prepared for example by the following method:

0.9 part of glyoxal monoureine dimethyl ether is dissolved while stirring at 85° C. in a solution of 1 part of 4-acetylaminophenylurea in 30 parts of 3% acetic acid. 0.6 part of concentrated hydrochloric acid is added to this solution and the whole kept at 85° C. for 20 minutes. After cooling the solution, the deposited colorless precipitate is filtered off and washed with water. 1.2 parts of N-(4-acetylaminophenyl)-glyoxaldiureine are obtained.

1 part of N-(4-acetylaminophenyl)-glyoxaldiureine is introduced while stirring into 50 parts of a 4% aqueous sodium hydroxide solution at 90° to 95° C. After about half an hour, the N-(4-acetylaminophenyl)-glyoxaldiureine has dissolved to form a clear solution; the solution is kept at 90° C. for another 15 minutes, filtered and the filtrate allowed to stand for 12 hours at room temperature; the deposited reaction product is filtered off and washed with cold water. The yield is 0.5 part of N-(4-aminophenyl)-glyoxaldiureine.

Dyestuffs having similar properties are obtained in the same way from the compounds in the following table (Examples 1 to 14):

Table

| Example No. | Diazo component | Coupling component | Color of the dyeing on cotton |
|---|---|---|---|
| 2 | N-(3-aminophenyl)-glyoxaldiureine. | 1-(2-chlor-5-sulfophenyl)-3-methylpyrazolone-(5). | greenish-yellow. |
| 3 | ----do---- | 1-hydroxynaphthalene-4-sulfonic acid. | scarlet. |
| 4 | ----do---- | 2-hydroxynaphthalene-8-sulfonic acid. | orange. |
| 5 | ----do---- | 1-acetylamino-8-hydroxynaphthalene-4,6-disulfonic acid. | bluish-red. |
| 6 | N-(4-aminophenyl)-glyoxaldiureine. | 1-(2-methyl-6-chlor-4-sulfophenyl)-3-methylpyrazolone-(5). | yellow. |
| 7 | ----do---- | 1-(3-sulfophenyl)-3-methylpyrazolone-(5). | orange-yellow. |
| 8 | ----do---- | 1-hydroxynaphthalene-3-sulfonic acid. | brownish-red. |
| 9 | ----do---- | 2-hydroxynaphthalene-7-sulfonic acid. | red. |
| 10 | ----do---- | 1-benzoylamino-8-hydroxynaphthalene-3,6-disulfonic acid. | violet. |
| 11 | N-(3-chlor-4-aminophenyl)-glyoxaldiureine. | 1-acetylamino-8-hydroxynaphthalene-3,6-disulfonic acid. | Do. |
| 12 | N-(3-methoxy-4-aminophenyl)-glyoxaldiureine. | 1-(2-chlor-5-sulfophenyl)-3-methylpyrazolone-(5). | orange-yellow. |
| 13 | ----do---- | 1-hydroxynaphthalene-4-sulfonic acid. | violet. |
| 14 | ----do---- | 1-acetylamino-8-hydroxynaphthalene-3,6-disulfonic acid. | violet-blue. |

EXAMPLE 15

A solution of 31.3 parts of N-(4-amino-3-sulfophenyl)-glyoxaldiureine, 4 parts of sodium hydroxide and 6.9 parts of sodium nitrite in 120 parts of water is added while stirring to a mixture of 100 parts of ice and 25 parts of hydrochloric acid of the density 1.15. After about an hour, the suspension obtained is allowed to flow into a solution of 22.4 parts of 2-hydroxynaphthalene-7-sulfonic acid, 4 parts of sodium hydroxide and 16 parts of anhydrous sodium carbonate in 300 parts of water. After 2 to 3 hours the reaction product is deposited by adding sodium chloride, filtered and stirred as an aqueous paste together with 100 parts of an aqueous 15% formaldehyde solution and 4 parts of sodium hydroxide for 20 hours at room temperature. The reaction mixture is then poured into a saturated aqueous sodium chloride solution, the deposited dyestuff containing methylol groups filtered off and dried at 40° to 50° C. under reduced pressure. It dyes cotton brilliant red shades of excellent wet fastness.

By using 28.9 parts of 1-(2-chlor-5-sulfophenyl)-3-methylpyrazolone-(5) instead of 2-hydroxynaphthalene-7-sulfonic acid, a dyestuff is obtained which dyes cotton brilliant red shades of very good fastness to wet treatment.

EXAMPLE 16

17.3 parts of 4-aminobenzene sulfonic acid are diazotized in the usual way and the solution of the diazonium salt allowed to flow into a solution of 23.5 parts of N-(4-hydroxyphenyl)-glyoxaldiureine, 4 parts of sodium hydroxide and 16 parts of anhydrous sodium carbonate in 300 parts of water. The mixture is stirred for 10 hours, the reaction product deposited by adding sodium chloride, filtered and stirred as an aqueous paste with 100 parts of a 15% aqueous formaldehyde solution and 2 parts of sodium hydroxide for 20 to 24 hours at room temperature. The dyestuff containing methylol groups is deposited by adding sodium chloride, filtered and dried at 50° C. under reduced pressure. It dyes cotton very fast yellow shades.

The N-(4-hydroxyphenyl)-glyoxaldiureine used as coupling component may be obtained for example in the following way:

3 parts of glyoxalmonoureine are introduced while stirring at 80° to 85° C. into a solution of 3 parts of 4-hydroxyphenylurea in 20 parts of 10% aqueous ethanol, 0.2 part of 18% hydrochloric acid added and the mixture stirred for another 10 to 15 minutes at 80° C. The precipitate which separates after cooling is filtered and washed with water. 26 parts of N-(4-hydroxyphenyl)-glyoxaldiureine are obtained.

EXAMPLE 17

23.4 parts of N-(4-hydroxyphenyl)-glyoxaldiureine and 4 parts of sodium hydroxide are dissolved in 80 parts of a 15% aqueous formaldehyde solution and the mixture left at room temperature for 24 hours. A diazo solution prepared in the usual way from 17.3 parts of 4-aminobenzene sulfonic acid is then added to this solution while stirring. After 6 to 8 hours, the dyestuff is precipitated by the slow addition of sodium chloride, filtered and dried at 50° C. at reduced pressure. The same dyestuff as in Example 16 is obtained.

EXAMPLE 18

A diazo solution prepared in the usual way from 13.7 parts of 2-aminobenzoic acid is allowed to flow while stirring into a solution of 36.4 parts of N-(8-hydroxy-6-sulfonaphthyl-(2))-glyoxaldiureine, 4 parts of sodium hydroxide and 16 parts of anhydrous sodium carbonate in 350 parts of water. After 2 to 3 hours the reaction product is deposited by adding sodium chloride, filtered and stirred as an aqueous paste with 4 parts of sodium hydroxide and 120 parts of an aqueous 15% formaldehyde solution for 20 hours at room temperature. The dyestuff containing methylol groups is then deposited by adding sodium chloride, filtered and carefully dried. It dyes textile materials of natural or regenerated cellulose orange-red shades of very good fastness to wet treatment.

The N-(8-hydroxy-6-sulfonaphthyl-(2))-glyoxaldiureine used as coupling component may be prepared for example in the following way:

A solution of 1 part of 8-hydroxy-6-sulfonaphthyl-(2)-urea in 5 parts of water is heated for an hour with 1 part of glyoxal monoureine dimethyl ether and 0.4 part of 7% hydrochloric acid, the deposited precipitate filtered off and washed with water. 0.6 part of N-(8-hydroxy-6-sulfonaphthyl-(2))-glyoxaldiureine is obtained.

EXAMPLE 19

2 parts of 1-amino-4-(4-ureido-phenylamino)-anthraquinone-2-sulfonic acid, 120 parts of 30% acetic acid, 1.3 parts of glyoxalmonoureine dimethyl ether and 4 parts of 18% hydrochloric acid are heated together at 80° C. for 2 hours, the cooled reaction mixture is allowed to stand for 12 hours at room temperature and then filtered. The filtrate is evaporated at dryness under reduced pressure and the residue washed with cold water. The total amount of the reaction product of the formula:

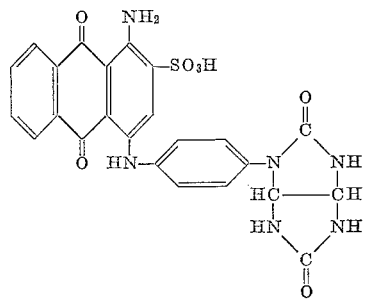

obtained is stirred for 20 to 24 hours at room temperature with 1 part of sodium hydroxide and 10 parts of an aqueous 10% formaldehyde solution. The reaction mixture is then poured into a saturated aqueous sodium chloride solution, the deposited dyestuff containing methylol groups filtered off and dried under reduced pressure at 40° to 50° C. It dyes cotton brilliant blue shades of excellent fastness properties.

If 2.1 parts of 1-amino-4-(4-ureido-2-sulfophenylamino)-anthraquinone-2-sulfonic acid are used instead of 1-amino-4-(4-ureido-phenylamino)-anthraquinone-2-sulfonic acid a dyestuff is obtained which dyes cotton greenish blue shades of excellent fastness properties.

EXAMPLE 20

23.3 parts of N-(4-aminophenyl)-glyoxaldiureine are diazotized as described in Example 1 and the diazo solution is allowed to flow into a solution of 36.4 parts of N-(8-hydroxy-6-sulfonaphthyl-(2))-glyoxaldiureine, 4 parts of sodium hydroxide and 16 parts of anhydrous sodium carbonate in 350 parts of water. After 2 hours the reaction product is separated by adding sodium chloride, filtered and stirred as an aqueous paste together with 5 parts of sodium hydroxide and 120 parts of 30% aqueous formaldehyde solution for 20 hours at room temperature. The dyestuff containing methylol groups is separated by adding sodium chloride, filtered and carefully dried. It dyes cotton brilliant red shades.

EXAMPLE 21

13.8 parts of 1-amino-4-nitrobenzene are diazotized in the usual way and a solution of 31.9 parts of 1-amino-8-hydroxynaphthalene-3,6-disulfonic acid and 4 parts of sodium hydroxide in 150 parts of water is allowed to flow into the diazo solution within an hour. After 12 hours' stirring the coupling has ended. 21.2 parts of anhydrous sodium carbonate are added and a diazo solution obtained by diazotiazation of 31.3 parts N-(4-amino-3-sulfophenyl)-glyoxaldiureine as described in Example 2 is allowed to flow into the mixture. The reaction mixture is stirred for 12 hours and then the reaction product is separated by adding sodium chloride. The product is filtered off and stirred as an aqueous paste together with 120 parts of 15% aqueous formaldehyde solution and 4 parts of sodium hydroxide for 20 hours at room temperature. The dyestuff thus obtained is salted out with sodium chloride, filtered off and dried at 50° C. under reduced pressure. It dyes cellulosic fabrics very fast navy-blue shades.

EXAMPLE 22

40 parts of the azo compound of the formula

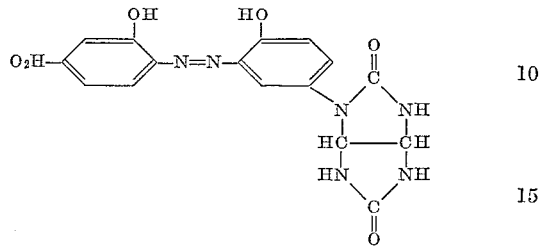

obtained by coupling diazotized 1-amino-2-hydroxy-4-nitrobenzene with 4-hydroxyphenyl glyoxaldiureine are heated together with 30 parts of sodium acetate and 40 parts of ammonium chromium sulfate in 300 parts of formamide for 5 hours at 95° C. The mixture is cooled to room temperature and poured into 700 parts of water. The chromium complex thus obtained is salted out by the addition of sodium chloride and filtered off. The filter cake is stirred with 4 parts of sodium hydroxide and 100 parts of a 15% aqueous formaldehyde solution for 20 hours at room temperature. The reaction mixture is poured into a saturated aqueous sodium chloride solution, the chromium complex dyestuff containing methylol groups is filtered off and dried under reduced pressure at 50° C. It dyes cotton brown shades of excellent wet fastness.

We claim:
1. A water-soluble dyestuff of the formula:

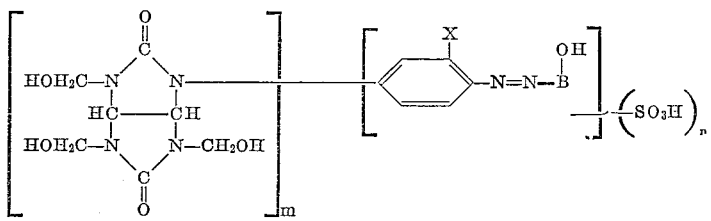

in which:
X represents a member selected from the group consisting of hydrogen, chlorine, methoxy and the carboxylic acid group;
B—OH represents a member selected from the class consisting of hydroxyphenyl-(2), 1-hydroxynaphthyl-(2), 2 - hydroxynaphthyl - (1), 1 - acetylamino - 8-hydroxynaphthyl - (7), 1 - benzoylamino - 8 - hydroxynaphthyl - (7), 1 - phenyl - 3 - methylpyrazol-5 - onyl - (4), 1 - (2 - chloro - 5 - phenyl) - 3-methylpyrazol - 5 - onyl - (4) and 1 - (2 - methyl - 6-chlorophenyl)-3-methylpyrazol-5-onyl-(4);
$m$ is a whole number from 1 to 2 with the proviso that each trismethylol-glyoxaldiureine group is attached to a carbon atom of a member selected from the group consisting of a benzene nucleus and a naphthalene nucleus; and
$n$ is a whole number from 1 to 3.

2. The dye of the formula:

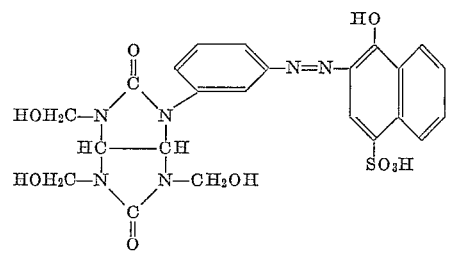

3. The dye of the formula:

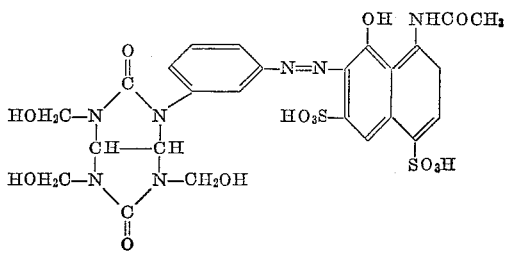

4. The dye of the formula:

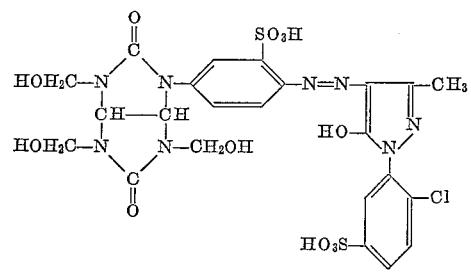

No references cited.

UNITED STATES PATENT OFFICE
CERTIFICATE OF CORRECTION

Patent No. 3,117,961 January 14, 1964

Guenter Lange et al.

It is hereby certified that error appears in the above numbered patent requiring correction and that the said Letters Patent should read as corrected below.

Column 1, line 49, for "benzenes" read -- benzene --; column 5, line 8, for "mehhylol" read -- methylol --.

Signed and sealed this 18th day of August 1964.

(SEAL)
Attest:

ERNEST W. SWIDER
Attesting Officer

EDWARD J. BRENNER
Commissioner of Patents